Nov. 17, 1959     A. F. HASBROOK     2,913,719
RADIOLOCATION METHOD AND APPARATUS
Filed April 9, 1954                  3 Sheets-Sheet 1
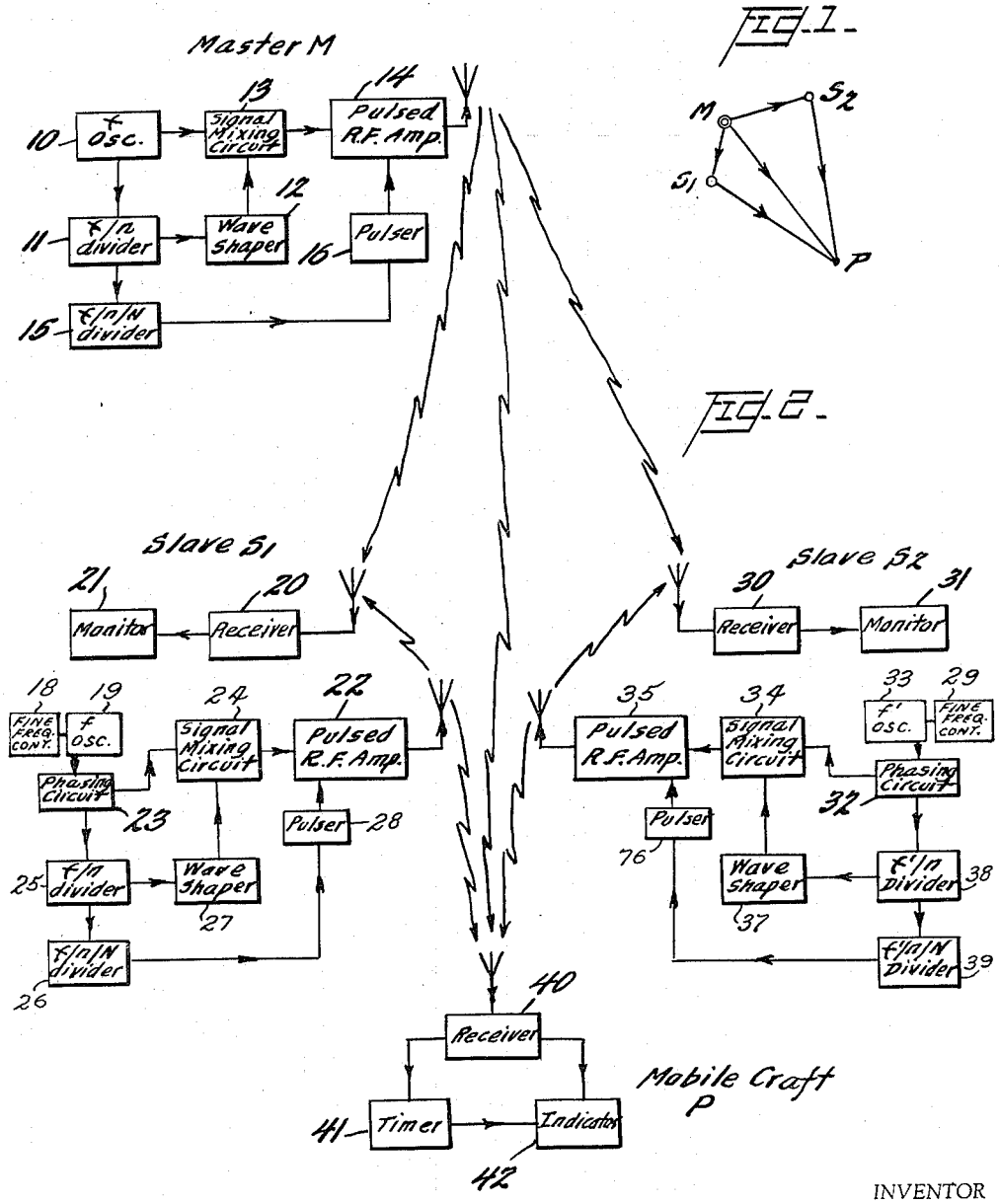
INVENTOR
Arthur F. Hasbrook
BY Watson, Cole, Grindle & Watson
ATTORNEYS

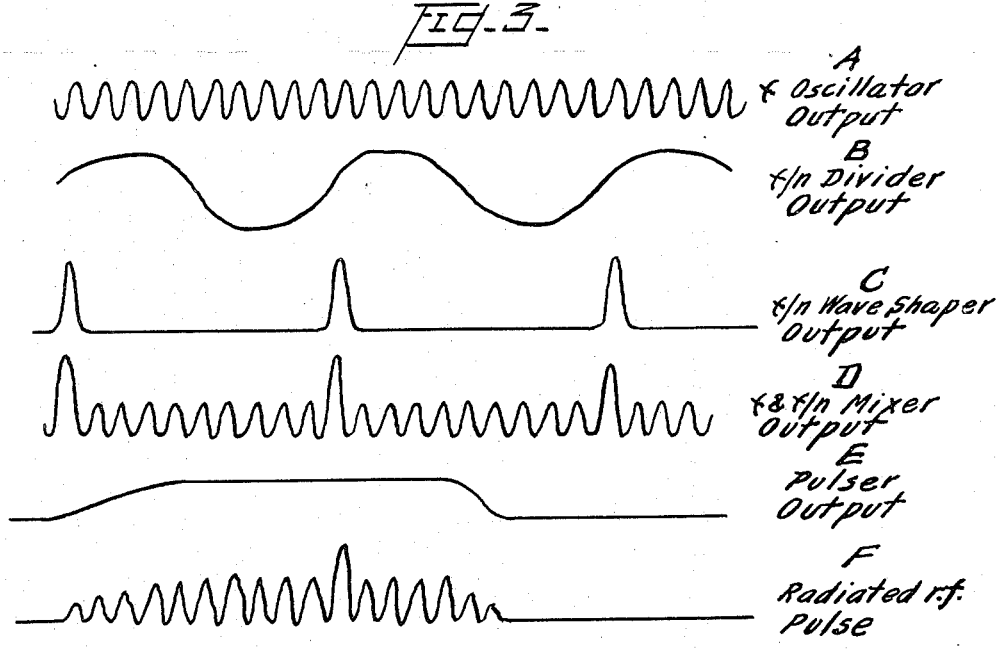
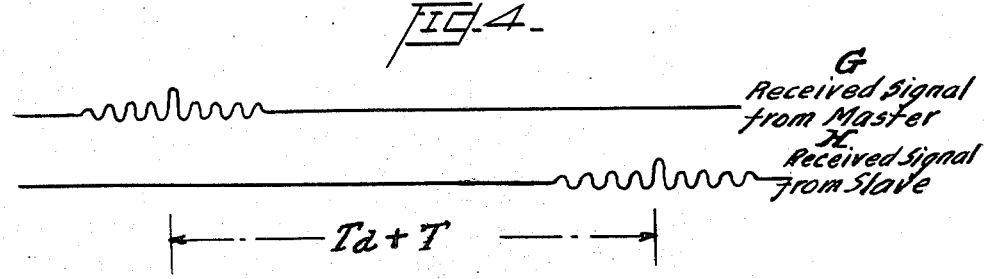

Nov. 17, 1959  A. F. HASBROOK  2,913,719
RADIOLOCATION METHOD AND APPARATUS
Filed April 9, 1954  3 Sheets-Sheet 3
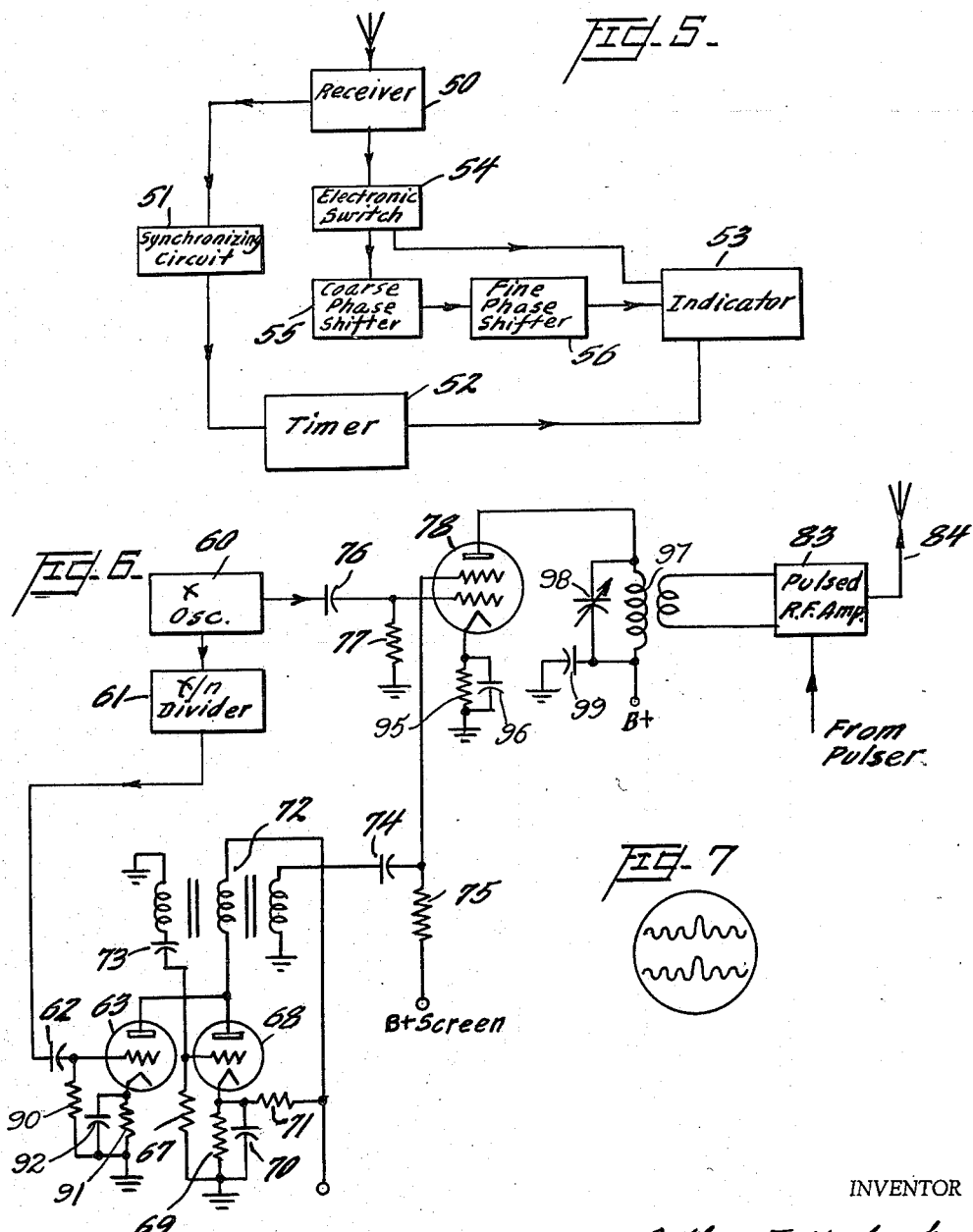
INVENTOR
Arthur F. Hasbrook
BY Watson, Cole, Grindle & Watson
ATTORNEYS

United States Patent Office 2,913,719
Patented Nov. 17, 1959

2,913,719

RADIOLOCATION METHOD AND APPARATUS

Arthur F. Hasbrook, San Antonio, Tex., assignor to Olive S. Petty, San Antonio, Tex.

Application April 9, 1954, Serial No. 422,099

15 Claims. (Cl. 343—103)

This invention relates to improved radiolocation methods and apparatus for use in long range surveying and navigation systems of the pulsed hyperbolic type. Radio navigation systems characterized by this mode of operation are commonly known as Loran systems.

The basic pulsed hyperbolic radiolocation system utilizes a transmitting network having a master transmitting station and two slave transmitting stations which radiate a synchronized group of pulsed radio signals. The synchronized pulses from all three stations are received at a remote point whose location is to be determined. By measuring the differences in the transit times from the master and a first of the slave stations to the receiving point, and from the master and the second slave station to the receiving point, two hyperbolic lines-of-position are determined which fix the position of the receiving point.

While such systems operating at medium or low frequencies have long ranges of operation, a minimum of ambiguity and high reliability, the accuracy is relatively low and insufficient for many applications in geodetic surveying. It has been proposed in the prior art to utilize cycle-matching of the individual cycles in the received radio-frequency pulses to improve the accuracy to within a cycle. It has been difficult, however, to identify the proper cycles to be matched; therefore, the measurements often become ambiguous by at least one radio-frequency cycle, which repersents a rather large locational error. For example, at 1800 kilocycles an error of one cycle in matching would result in an over-all error of about 273 feet.

It might be thought possible to accurately identify and match the very first cycles in the pulse envelopes, but this is not practical because the pulse amplitude must rise from zero to maximum over a period of perhaps 20 or 30 cycles. Thus, the first cycle is always quite low in amplitude and rarely can be identified positively. If the radiations from the transmitters are short radio-frequency pulses, then the accuracy of the measurements is limited, in the final analysis, by the rise time of the radiated pulses. At medium or low transmission frequencies the pulse length to insure proper transmission operation is such as to limit the accuracy to a considerable fraction of a microsecond, corresponding to some hundreds of feet. Such accuracy is insufficient for most geodetic surveying applications wherein accuracies of a few tens of feet or better is desirable.

In order to improve the accuracy, the actual radio-frequency cycles constituting the pulse envelopes may be compared in time; however, the relatively large number of radio-frequency cycles in a pulse necessitates that the proper cycles to be matched be accurately identified in order to eliminate large ambiguities.

Accordingly, a principal object of the invention is to improve the locational accuracy of pulsed hyperbolic systems by minimizing cyclic ambiguity.

Another object of this invention is to provide improved methods and apparatus for determining and controlling the delay time or phasing of the radio-frequency pulse sequence emanating from a slave transmitter of a pulsed hyperbolic radiolocation system.

These objects are attained herein by a novel method of transmission wherein specified individual cycles of the pulses transmitted by the master and slave stations of the radiolocation network are marked with a distinguishing characteristic such as, for example, substantially increased amplitude. With such a mode of operation the conventional delay in the transmission times of the slave pulses can be closely controlled and the received master and slave pulse pairs can be accurately matched without cyclic ambiguity.

In a preferred structural embodiment for practicing the above improved method, the circuitry of all of the transmitting stations is modified so that a series of synchronized pulse signals is transmitted in a known and controllable relationship, with a single cycle of each of the pulses being amplitude modulated to produce a substantially increased amplitude for that cycle. Monitoring and phasing equipment is provided at the slave stations so that a zero or known phase shift can be maintained between the master and slave radiations which is accurately determinable from the marked cycles, and at the receiving station cyclic ambiguity between the master and slave pulses is eliminated by operating phase-shifting apparatus until the marked cycles for the master and slave pulses are made to coincide.

Further objects and features of the invention will be apparent from the following description taken in connection with the accompanying drawing, in which:

Figure 1 is a diagrammatic representation of a basic pulsed hyperbolic radiolocation system;

Figure 2 is a block diagram of a conventional pulsed hyperbolic radiolocation system modified to incorporate the principles of this invention;

Figure 3 is a series of curves showing typical waveforms appearing at various points of the system of Figure 1;

Figure 4 is a series of curves showing the output waveforms for the system of Figure 1;

Figure 5 is a detailed block diagram of a mobile receiving station adapted for receiving hyperbolic radiolocation pulse signals characterized by a marked cycle;

Figure 6 is a schematic diagram of a preferred circuit embodiment for distinctively marking the pulse envelopes of the master and slave transmitters; and Figure 7 is a representation of the cathode-ray tube display of a receiver showing distinctively marked master and slave signals.

In Figure 1 the general arrangement of a hyperbolic system is illustrated by way of explaining the invention. Master station M, station S1, and slave station S2 comprise the transmitting network which radiates a synchronized group of radio signals. Pulses radiated from slave stations S1 and S2 are maintained synchronism with those from master station M. The pulses from all three stations are received at a point P whose location is to be determined. By measuring the differences in transit times from M and S1, and M and S2, two hyperbolic lines-of-position are determined so as to permit the fixing of point P.

Figure 2 shows the general arrangement of the present invention wherein means are provided for properly identifying certain radio-frequency cycles in each transmission, and thus eliminating this source of ambiguity. The master M, slave S1 and slave S2, as discussed previously in the general diagram of Figure 1, are shown in detail in the block diagram of Figure 2. At master M, the basic carrier frequency $f$ is determined by oscillator 10, which usually will be crystal-controlled to comply with licensing regulations. The output frequency of oscillator 10 is divided to a suitable lower frequency $f/n$ by means of $f/n$ divider 11. The phasing between the oscillator 10 and $f/n$ divider 11 may be made stable by suitable conventional design of the divider circuits.

The output of divider 11 is transmitted through wave shaper 12 which forms the input wave into a shape essentially the same as a half cycle of the original $f$ frequency. The outputs of both oscillator 10 and wave shaper 12 are then combined in a signal mixing circuit 13 such that the output of this circuit is a sine wave in which every $f/n$ cycle is marked distinctively by an amplitude increase, so as to permit ready identification of that particular cycle. From a generic aspect, however, this cycle can be marked in many other ways, such for example, by decreasing the amplitude or modulating the wave periodically by a synchronized higher frequency wave form to provide a notch or dip on selected cycles. Structure for generating a distinctively marked sine wave has been described in my copending application Serial No. 84,359, filed March 30, 1949, now Patent No. 2,699,544, issued January 11, 1955. The distinctively marked output of mixing circuit 13 is then applied as excitation to pulsed radio-frequency amplifier 14.

In order to provide a pulse carrier output of high peak output, radio-frequency amplifier 14 is maintained in a normally quiescent condition and operated only intermittently by the application of a pulse-modulation signal from pulser 16. In order to synchronize the pulse repetition rate in a definite relationship to the carrier frequency, the output of $f/n$ divider 11 is transmitted through an additional divider $f/n/N$ 15 which furnishes a relatively low frequency output for use in the pulsing circuit. The output of $f/n/N$ divider 15 is then used to trigger a pulser, or pulse modulator circuit 16. Pulser 16 furnishes a high amplitude modulation pulse for each trigger pulse delivered by $f/n/N$ divider 15. The pulsed radio-frequency amplifier 14 is maintained normally quiescent, in spite of excitation from mixing circuit 13, by either overbias on one of the grids or lack of plate potential. When the modulation pulse is applied for pulser 16, radio-frequency amplifier 14 is excited to output by excitation from mixing circuit 13 with an ultimate transmission of energy to the associated antenna. Thus the output signal consists of pulses, at a rate determined by $f/n/N$ divider 15, with each pulse envelope consisting of a considerable number of cycles of frequency $f$ and at least one of these pulses distinctively marked as previously described.

The production of the radiated signals from master M may be understood somewhat more clearly by study of the waveforms shown in Figure 3. The output of oscillator 10 is a continuous sine wave as shown in waveform A. The output of the $f/n$ divider circuit 11 is a sine wave of lower frequency as shown in waveform B, although alternately the divider 11 could be of the pulse type delivering pulses at a repetition rate $f/n$. Wave shaper 12 is excited by $f/n$ divider 11 and shapes the input signal into the form shown in waveform C, wherein the shape is essentially that of a half cycle of the original $f$ frequency. When waveforms A and C are combined properly in signal mixing circuit 13, the output is a sine wave of frequency $f$ wherein each $n$th cycle is distinctly marked, for example by an amplitude increase such as is illustrated in waveform D. Waveform D is applied as excitation to radio-frequency amplifier 14 which, however, is normally quiescent.

A much lower control repetition rate is obtained by use of $f/n/N$ divider 15 and applied as a trigger to pulser 16. The output of pulser 16 will preferably be a pulse which rises rather slowly, to minimize interference to nearby channels, maintains a high amplitude for a considerable period, and then falls to zero. This output of pulser 16 is shown in waveform E. When the pulse from pulser 16 is applied to radio-frequency amplifier 14, the excitation for mixing circuit 13 is effective in producing radio-frequency output from amplifier 14, as shown in waveform F. It will be noted that the pulse envelope of F contains a considerable number of radio-frequency cycles one of which is distinctively marked. This distinctive marking permits ready unambiguous matching of cycles as will become more apparent as the description proceeds.

The slave stations S1 and S2 shown in block diagram in Figure 2 are quite similar to master M except that additional monitoring and phasing equipment is provided for maintenance of a zero or known phase shift between master and slave radiations. At slave S1, for example, receiver 20 detects both the radiation from master station M and local radio-frequency power amplifier 22. By displaying the waveforms of these signals on cathode-ray monitor 21, any phase change may be noted and corrected for by adjustment of phasing circuit 23 or other phasing circuits (not shown) at various points in the equipment.

A very fine manual frequency control 18 is coupled to local oscillator 19 so that the oscillator output can be adjusted as necessary to eliminate drift with respect to the received master frequency. Monitor 21 is employed to detect any such drift. The output of oscillator 19 is coupled to the phasing circuit 23 and is applied in part to amplifier 22 through mixing circuit 24, and in part to divider 25 the output of which drives divider 26 and wave shaper 27. Divider 26 triggers pulser 28 at the appropriate times in the operational sequence.

Similarly at slave station S2, the equipment is similar to that of the master M except for the addition of a receiver 30, monitor 31 and phasing circuit 32. Components 29, 30, 31, 32, 33, 34, 35, 36, 37, 38 and 39 of slave station S2 correspond in function to components 18, 21, 20, 23, 19, 24, 22, 28, 27, 25 and 26, respectively, of slave station S1. It will be noted, however, that the radiations from S2 are on frequency $f_1$ so as to permit the $f$ signals of the master M or slave S1 to be distinguished. If desired, of course, somewhat different pulse rates might be used for the M/S1 and M/S2 combinations so as to avoid ambiguity as to the stations being used or, alternately all signals could be radiated on the same frequency in time sequence. The net result then of all transmissions from master M, slave S1 and slave S2 is to set up a series of synchronized pulse signals in known time relationship with certain individual cycles of the radio frequency envelopes being distinctively marked so as to permit accurate matching at a remote receiver.

In a specific application all the synchronized radiated signals may be received at a remote mobile craft P which carries a suitable receiver 40, timer 41 and indicator 42. Receiver 40 may be tuned so as to intercept the desired transmissions, amplify them, and apply resulting signals to an indicator 42. As associated timer 41 is synchronized with the received signals and applies sweep and gating voltages to indicator 42 which may have a cathode-ray tube display. The distinctively marked carrier envelopes may then be compared on the cathode-ray tube display and the phase or time differences determined so as to furnish the hyperbolic position data. These distinctively marked pulse envelopes will be as shown in waveforms G and H of Figure 4, wherein there will be, preferably, a normal fixed delay $Td$ between the envelopes and a time difference T corresponding to the difference in transit times from the slave and master to the receiver.

While the reception and utilization of the synchronized signals, at a mobile station P, has been described in general terms above, the determination of time differences at the mobile station is now state in more detail. Referring to Figure 5, which is a more detailed block diagram of the mobile receiving station, receiver 50 suitably intercepts the radiations from the several transmitting stations. In order to simplify this description, it is assumed that signals are received from the master and one slave so as to define one hyperbolic line of position. The received pulse signal from the master is used to synchronize via synchronizing circuit 51 the operation of timer 52; thus for each synchronizing pulse signal the timer 52 furnishes a sweep signal to indicator 53. The received master and slave signals are separated by means of electronic switch 54 and sent via different paths to the indicator 53. Assuming that the master signal always precedes the slave signal by a minimum amount of time, then the slave signal is sent directly to indicator 53 and the master signal is sent through coarse phase-shifter or delay circuit 55 and fine time phase shifter or delay circuit 56.

While other type indicators may be utilized, a cathode-ray display of the type shown in Figure 7 is satisfactory. As shown, timer 52 furnishes sweep traces which are separated in vertical position, and the master signal appears on one trace and the slave signal on the other. By adjustment of phase shifters or delay circuits 55 and 56, the two waveforms may be made to coincide in time position on the traces. The time-difference may then be read directly off of the phase shifter dials. For the other line of position (utilizing the master and other slave), the receiver may be switched so as to receive the proper signals and the matching procedure repeated. In the alternative additional receivers, phase shifters, etc. may be provided for the determination of the second hyperbolic line-of-position.

In Figure 6 there is shown in schematic form a suitable arrangement for distinctively marking one of the pulse envelope's cycles at the master and slave transmitters. Excitation is applied at carrier frequency f by oscillator 60 to the control grid of signal mixing tube 78 through coupling capacitor 76 and grid-return resistor 77. A signal at the f frequency is applied also to f/n divider 61 from which an output frequency f/n is obtained to trigger the blocking oscillator comprising tubes 63 and 68, and associated elements. Tube 68 is normally non-conducting because of excess cathode-bias applied by network 69, 70 and 71.

A blocking oscillator transformer 72 of suitable characteristics is connected in the plate circuit of tube 68. When a suitable trigger signal of f/n frequency is applied through capacitor 62 to tube 63 and ultimately to the plate circuit of tube 68, blocking oscillator action is started. A single positive polarity pulse appears across the output of transformer 72 which is transmitted through capacitor 74 to resistor 75 which is connected in the screen circuit of signal mixing tube 78. By suitable adjustment of timing elements capacitor 73 and resistor 67, as well as the choice of transformer 72 characteristics, this output pulse may be made to match essentially the waveform of the positive cycle of the sine wave from oscillator 60. This f/n signal as applied to the screen grid of tube 78 effects amplitude modulation such that the output of signal mixing tube 78 is essentially as shown in waveform D of Figure 3. This distinctively marked excitation is then applied to pulsed radio-frequency amplifier 83, becomes part of the pulse envelope as previously described, and is radiated by antenna 84.

Resistor 90 provides a grid return for tube 63, and resistor 91 and its shunting capacitor 92 provide cathode bias for tube 63 in the conventional manner.

Resistor 95 and capacitor 96 provide cathode bias for tube 78 in the conventional manner, and inductor 97 and capacitor 98 provide a conventional parallel resonant tank circuit. Blocking capacitor 99 isolates the B+ source from the radio-frequency energy of the tank circuit.

It is to be understood that the above-described arrangements are merely illustrative of the principles of the invention. Numerous other arrangements may be devised by those skilled in the art without departing from the scope of this invention.

Having thus described the invention, what is claimed as new and desired to be secured by Letters Patent is:

1. A method of resolving cyclic ambiguity in a radio-location system which establishes a hyperbolic line of position for a receiving station by measurement of the time difference of arrival of radio-frequency pulses emanating from a pair of transmitting stations at a synchronized and identical pulse repetition rate, comprising the steps of distinctively marking prior to transmission a single radio-frequency cycle of each of said pulses, transmitting said marked pulses from both of said transmitting stations with a known time difference determinable from said marked cycles, and measuring the time difference of arrival at said receiving station of said pulses by accurately matching both of said pulses with respect to said marked cycles.

2. A method of resolving cyclic ambiguity in a radio-location system which establishes a hyperbolic line of position for a receiving station by measurement of the time difference of arrival of radio-frequency pulses emanating from a pair of transmitting stations at a synchronized and identical pulse repetition rate, comprising the steps of distinctively marking prior to transmission a single radio-frequency cycle of each of said pulses by amplitude modulation, transmitting said marked pulse from both of said transmitting stations with a known time difference determinable from said marked cycles, and measuring the time difference of arrival at said receiving station of said pulses by accurately matching both of said pulses with respect to said marked cycles.

3. A method of resolving cyclic ambiguity in a radio-location system which establishes a hyperbolic line of position for a receiving station by measurement of the time difference of arrival of radio-frequency pulses emanating from a pair of transmitting stations at a synchronized and identical pulse repetition rate, comprising the steps of distinctively marking prior to transmission a single radio-frequency cycle of each of said pulses by substantially increased amplitude, transmitting said marked pulses from both of said transmitting stations with a known time difference determinable from said marked cycles, and measuring the time difference of arrival at said receiving station of said pulses by accurately matching both of said pulses with respect to said marked cycles.

4. A method of resolving cyclic ambiguity in a radio-location system which establishes a hyperbolic line of position for a receiving station by measurement of the time difference of arrival of radio-frequency pulses emanating from a pair of transmitting stations at a synchronized and identical pulse repetition rate, comprising the steps of distinctively marking prior to transmission a portion of each of said pulses by substantially increased amplitude, transmitting from both of said transmitting stations said marked pulses with a known time difference determinable from said marked portions, and measuring the time difference of arrival at said receiving station of said pulses by accurately matching both of said pulses with respect to said marked portions.

5. A method of resolving cyclic ambiguity in a radio-location system wherein positions are determinable from measurements of the time difference of arrival of radio-frequency pulses emanating from a pair of transmitting stations, comprising the steps of distinctively marking prior to transmission a single radio-frequency cycle of each of said pulses, transmitting said marked pulses from both of said transmitting stations with a specified time difference determinable from said marked cycles, and measuring from said marked cycles the time difference of arrival of said marked pulses at said receiving station.

6. A method of resolving cyclic ambiguity in a radio-location system which establishes a hyperbolic line of position for a receiving station by measurement of the time difference of arrival of radio-frequency pulses emanating from a pair of transmitting stations at a synchronized and identical pulse repetition rate, comprising the steps of distinctively marking prior to transmission a single radio-frequency cycle of each of said pulses, transmitting said marked pulses from both of said transmitting stations with a specified time difference determinable from said marked cycles, and measuring from said marked cycles the time difference of arrival of said marked pulses at said receiving station.

7. A method of radiolocation, comprising the steps of distinctively marking a single radio-frequency cycle of each pulse of a pulse sequence to be transmitted from each of a pair of transmitting stations at a synchronized and identical pulse repetition rate, transmitting said marked pulses from both of said transmitting stations with a specified time difference determinable from said marked cycles, and measuring from said marked cycles the time difference of arrival of said marked pulses at a receiving station by accurately matching the marked cycles.

8. A method of radiolocation, comprising the steps of distinctively marking by substantially increased amplitude a portion of each pulse of a pulse sequence to be transmitted from each of a pair of transmitting stations, transmitting said sequences of marked pulses from both of said transmitting stations with a specified time difference, and measuring from said marked pulse portions the time difference of arrival of said marked pulses at a receiving station.

9. A method of radiolocation, comprising the steps of distinctively marking by amplitude modulation a single radio-frequency cycle of each pulse of a pulse sequence to be transmitted from each of a pair of transmitting stations, transmitting said sequences of marked pulses from both of said transmitting stations with a specified time difference, and measuring from said marked cycles the time difference of arrival of said marked pulses at a receiving station.

10. A method of radiolocation, comprising the steps of distinctively marking a single radio-frequency cycle of each pulse of a pulse sequence to be transmitted from each of a pair of transmitting stations at a syncronized and identical pulse repetition rate, transmitting said sequences of marked pulses from both of said transmitting stations with a known time difference, and measuring from said marked cycles the time difference of arrival of said marked pulses at a receiving station.

11. A method of radiolocation, comprising the steps of distinctively marking a single radio-frequency cycle of each pulse of a pulse sequence to be transmitted from each of a pair of transmitting stations at a synchronized and identical pulse repetition rate, transmitting said sequences of marked pulses from both of said transmitting stations with a specified time difference determinable from said marked cycles, and measuring from said marked cycles the time difference of arrival of said marked pulses at a receiving station.

12. In a pulsed hyperbolic radiolocation system, the combination comprising a radio transmitter for transmitting a sequence of radio-frequency pulses, and an amplitude modulator for amplitude modulating a single cycle of each of said pulses.

13. In a pulsed hyperbolic radiolocation system, the combination comprising a radio transmitter for transmitting a sequence of radio-frequency pulses, and means for distinctively marking a cycle of each of said pulses.

14. In a pulsed hyperbolic radiolocation system the combination comprising a master transmitter radiating a sequence of radio-frequency pulses, each of said pulses having a single distinctively marked radio-frequency cycle, a slave transmitter radiating in synchronism with said master transmitter a second sequence of radio-frequency pulses, each of the pulses of said second sequence having a single distinctively marked radio-frequency cycle, and a receiving station for determining the time difference of arrival of the pulses transmitted by said master and slave stations by measurements made with respect to the marked cycles thereby establishing a hyperbolic line of position for said receiving station.

15. In a pulsed hyperbolic radiolocation system, the combination comprising a master transmitter radiating a sequence of amplitude marked radio-frequency pulses, a slave transmitter radiating in synchronism with said master transmitter a second sequence of amplitude marked radio-frequency pulses, and a receiving station for determining the time difference of arrival of the pulses transmitted by said master and slave stations by matching said pulses with respect to the marked portions thereby establishing a hyperbolic line of position for said receiving station.

References Cited in the file of this patent

UNITED STATES PATENTS

| | | |
|---|---|---|
| 2,408,773 | Goodall | Oct. 8, 1946 |
| 2,419,525 | Alford | Apr. 29, 1947 |
| 2,436,376 | Bown | Feb. 24, 1948 |
| 2,578,980 | O'Brien | Dec. 18, 1951 |
| 2,647,257 | Dean | July 28, 1953 |
| 2,728,909 | Palmer | Dec. 27, 1955 |

FOREIGN PATENTS

| | | |
|---|---|---|
| 577,824 | Great Britain | June 3, 1946 |
| 600,117 | Great Britain | Mar. 31, 1948 |